Patented Jan. 9, 1951

2,537,114

UNITED STATES PATENT OFFICE 2,537,114

PIGMENT COATED PAPER

Arthur E. Young and Elmer K. Stilbert, Midland, Mich., assignors to The Dow Chemical Company, Midland, Mich., a corporation of Delaware No Drawing. Application February 26, 1948, Serial No. 11,333

9 Claims. (Cl. 117—155)

This invention concerns an improved paper coating composition and paper coated therewith. It relates to coating compositions comprising aqueous dispersions of a mineral pigment and, as an adhesive, a sizing agent together with a copolymer of butadiene and styrene, and the use of such compositions in the manufacture of coated paper.

Mineral pigment coated paper suitable for printing is usually prepared by coating a stock paper with an aqueous dispersion comprising a mixture of an inert mineral pigment such as china clay, blanc fixe, calcium carbonate, titanium dioxide or the like and a sizing agent such as glue, casein, starch, vegetable protein, etc., as an adhesive or binding agent. After drying, the surface of the coated paper is polished to a high finish by super-calendering. Paper coated with mineral pigment and the usual size, e. g. casein, as binding agent or adhesive has wide application and is generally satisfactory, yet has certain disadvantages.

Among the disadvantages are: difficulty of calendering the coating to a perfectly level surface because of the resistance to flow of the dry binding agent, stiffness of the coated paper particularly where heavy loading of the paper or relatively great proportions of the size are employed to obtain a high gloss, curling of the paper in the printing press and unsatisfactory ink acceptance.

It is an object of the invention to provide a coated paper which is free from the above-mentioned disadvantages. Another object is to provide a coated paper having improved printing properties. Still another object is to provide a coated paper that can readily be calendered to a smooth level surface. A further object is to provide a coated paper with improved printing properties. A still further object is to provide a coated paper resistant to water vapor. Another object is to provide a coated paper having the characteristics just stated and capable, when necessary, of readily being repulped and reworked to make new paper. Other and related objects will become apparent as the description of the invention proceeds.

The above and related objects are accomplished by the following invention in which paper is provided with a coating composition containing a mineral pigment, and, as an adhesive or binder, both a size and a copolymer of from 30 to 50 per cent butadiene and from 70 to 50 per cent styrene.

We have found that aqueous mineral pigment dispersions containing, as an adhesive or binding agent, a combination of a size such as casein, starch, soya flour, etc., and a dispersed copolymer of butadiene and styrene may be applied to paper to provide a coating possessing properties superior to coatings formed by aqueous pigment dispersions containing a water-dispersible size as the only component having adhesive or binding characteristics. Thus, an aqueous clay dispersion containing, as a binding agent, both casein and a colloidal copolymer of butadiene and styrene, may be applied to obtain coated paper having greater flexibility and limpness and better printing properties than paper provided with a coating containing the clay together with casein alone as the binding agent. Employment of the copolymer in the coating composition results in a coating having a good gloss, increased strength and improved resistance to water vapor. Pigment coatings containing starch and a copolymer of butadiene and styrene as adhesive are readily calendered to a smooth level surface since the copolymer is plastic and permits slight flow of the coating during the super-calendering operation. Employment of the copolymer in these coatings results in a better gloss, improved inking properties and better resistance to moist atmospheric conditions. The coated paper is more flexible and relaxed than similar coated paper employing starch alone as the adhesive. Pigment coatings employing vegetable protein and a copolymer of butadiene and styrene as the adhesive have a marked improvement in adhesiveness, flexibility, smoothness, gloss and water resistance, as compared with coatings similarly prepared and applied except for omission of the copolymer.

The compositions employed in making the product of this invention are obtained by employing an aqueous colloidal solution, hereinafter called a synthetic latex, of a copolymer of butadiene and styrene as a part of the adhesive and mixing the synthetic latex with an aqueous dispersion of an inert mineral pigment, e. g. clay, containing as the other adhesive an aqueous solution of a size such as casein, starch, or vegetable protein. The two dispersions are first separately prepared and the solids content adjusted within wide limits. It is, of course, essential that the two dispersions be such that they are compatible on being mixed. This requires a similarity of ionic charge and pH value such that one suspension will not cause coagulation or precipitation of the other.

Stable coating compositions containing a copolymer of butadiene and styrene can be made with most coating clays, calcium carbonate, titanium dioxide and pigments containing only small amounts of free di- and trivalent ions such as aluminum, iron, barium, etc. Acid clays or highly alkaline pigments, e. g. satin white, are not operable in practice of the invention since they precipitate the latex.

From 8 to 30 parts, on a dry weight basis, of the adhesive or binding agent is usually employed per 100 parts of mineral pigment, the preferred proportion being dependent upon the degree of loading of the paper and the purpose for which the paper is to be used. Thus, heavy art paper usually carries a thick coating of pigment with a high proportion of adhesive to provide a smooth coating which will absorb ink quickly yet is hard enough to resist lift by the inking plate or roll. Other paper may carry only sufficient loading of pigment and adhesive to permit printing without smearing of the ink.

As previously mentioned, a great improvement in the properties of surface coated papers is attained when the size such as casein, starch, vegetable protein or the like employed as adhesive, is substituted in part by a copolymer of butadiene and styrene. The copolymer may be employed in the proportions of from 0.333 to 3 parts, preferably 0.5 to 2 parts, by weight per part of the size used. Most satisfactory results are obtained when the adhesive, i. e the combined proportions of copolymer and size, is employed in the same proportions as would be the casein, starch or protein if used alone for any given grade of paper.

The synthetic latices comprising copolymers of butadiene and styrene to be employed in practice of the invention are obtained by polymerizing mixtures consisting of from 30 to 50 per cent butadiene and from 70 to 50 per cent styrene in aqueous emulsion by known procedure. The copolymers contain butadiene and styrene chemically combined in relative proportions within the limits just given. The polymerization is usually carried out by heating a mixture of butadiene and styrene at temperatures between 50° and 100° C. in a closed vessel with agitation in the presence of water containing an emulsifying agent, e. g. sodium lauryl sulfate, sodium alkylarylsulfonate, etc., and from 0.3 to 4 per cent of a catalyst such as potassium persulfate, hydrogen peroxide, sodium perborate, benzoyl peroxide or the like. The polymerization is preferably carried out in a neutral or slightly alkaline emulsion since the coating compositions are neutral or slightly basic dispersions, although the polymerization may be carried out in acid medium and the basicity of the synthetic latex adjusted to the desired pH by addition of an aqueous solution of ammonia, tetrasodium pyrophosphate, or sodium phosphate prior to addition of the latex to the clay or pigment dispersion.

The concentration of solids in the synthetic latex may be modified by the proportion of water employed in carrying out the polymerization. The latex may contain from 10 to 60 per cent by weight or more of solids, although usually a latex containing from 35 to 50 per cent solids is employed. Since the latex is a mobile liquid which shows only a slight change in viscosity with change in concentration of solids, blends of the latex with a size, e. g. starch, permit the use of a greater concentration of adhesive and pigment without excessive thickening of the coating composition than when the latex is omitted.

The copolymers of butadiene and styrene in the above-described proportions have adhesive properties similar to that of casein and starch. The opacity of the copolymer with pigments is greater than that of starch and slightly less than that of casein when employed in like proportions, and it may advantageously be substituted in whole or in part for such size or adhesives in the manufacture of clay coated paper. It is preferred to substitute the copolymer, in aqueous colloidal solution, for only a part of a usual adhesive such as starch or casein since, when the copolymer is used as the sole binding agent for the pigment coating, the broke cannot readily be reused in the beaters. It is disintegrated only after long beating. Blends of the copolymer with the usual size, e. g. starch, wherein the copolymer is employed in proportions not greater than 3 parts by weight per part of size, provide an improved coated paper, yet allow the broke to be readily disintegrated in the beater and reused.

The synthetic latices just described are compatible with aqueous dispersions of casein, soya flour and refined vegetable protein prepared with usual cutting agents such as sodium hydroxide, borax, trisodium phosphate, sodium silicate, sodium carbonate, sodium bicarbonate and mixtures of borax and sodium carbonate. They are compatible with neutral or slightly alkaline aqueous dispersions of soluble starch. Many of the chemically treated starches, particularly the acid hydrolyzed and oxidized (chlorinated) starches are acidic, i. e. show an acid reaction to litmus paper when solubilized by heating with water. Such acid-reacting aqueous dispersions of starch are neutralized, prior to use, by addition of a base or a basic compound, e. g. sodium hydroxide, trisodium phosphate, sodium carbonate, etc. The base or basic compound may be added to the water during the solubilizing procedure, if desired. Acid-reacting starch dispersions which have been neutralized are preferably filtered prior to addition to the pigment dispersion. The compatibility of the latex with starch solutions is much improved by first stabilizing the latex by addition, in aqueous solution, of a small amount of casein, e. g. an amount corresponding to from 2 to 3 per cent of the weight of the copolymer, prior to addition of the latex to the starch solution or dispersion of pigment and starch.

The aqueous dispersion of pigment, e. g. clay, may be prepared in known manner employing concentrations of from 30 to 70 per cent by weight of pigment. Such known procedure usually consists of deflocculating or immobilizing a slurry of clay and water by the addition, in aqueous solution, of a small amount of a complex phosphate such as tetrasodium pyrophosphate, sodium hexametaphosphate, sodium tetraphosphate or the like and stirring the slurry until a smooth paste is obtained. In general, from 0.2 to 1 part by weight of the phosphate compound per 100 parts of clay or pigment is sufficient to produce a paste having good slip.

After deflocculating the pigment, the desired proportion of size, e. g. casein, is added as an aqueous dispersion to the pigment slip and mixed therewith by stirring.

In preparing the aqueous coating compositions it is preferred first to add the solution of a size, e. g. casein, to the pigment slip and thereafter add the synthetic latex to the pigment dispersion with stirring, but the ingredients may be admixed in any order desired. It should be noted that when a casein solution is added to a concentrated synthetic latex excessive thickening often results. Such thickening is not observed when the casein is first added to the pigment slip and the latex thereafter added. Antifoaming agents such as pine oil, alkalies, sulfonated castor oil or the like may be added to the coating composition, if desired. When employed they are preferably added to the pigment slip prior to addition of the latex.

The following examples illustrate practice of the invention, but are not to be construed as limiting the scope thereof:

Example 1

To a clay slip in the form of a smooth paste prepared by stirring 100 parts by weight of coating clay with 66.7 parts of water and 0.5 part of tetrasodium pyrophosphate ($Na_4P_2O_7 \cdot 10H_2O$) there was added a dispersion of casein obtained by heating a mixture of 4 parts of casein, 21 parts of water, 0.4 part of borax and 0.2 part of sodium carbonate on a water bath at 60° C. for one hour. To the mixed dispersion of clay and casein there was then added with stirring 12 parts of a copolymer of 40 per cent butadiene and 60 per cent styrene as an aqueous colloidal solution containing 45 per cent by weight of solids. The resultant compositon was applied to an unsized high sulfite coating grade paper in amounts corresponding to a dry coating of 16 pounds per 500-ream of 25 inch by 38 inch sheets. The coated paper was air-dried at room temperature and thereafter conditioned for 16 hours at 70° F. and 50 per cent relative humidity. It was then calendered in a usual manner. The calendered product was a relaxed flexible paper which did not curl on printing. The coating had a high gloss, excellent printability, and had good reflectance.

Example 2

To a clay dispersion, containing 100 parts by weight of clay and prepared by procedure similar to that described in Example 1, there was added a dispersion of oxidized (chlorinated) starch obtained by heating a mixture consisting of 10 parts by weight of Superfilm No. 6, (an oxidized corn starch), and 40 parts of water at a temperature of 88° C. for 30 minutes. There were then added 10 parts of a copolymer of 40 per cent butadiene and 60 per cent styrene, as a synthetic latex containing 45 per cent solids, and 1 part of an antifoaming agent consisting of a mixture of 90 per cent sulfonated castor oil and 10 per cent pine oil. The mixture was stirred for one hour, screened through a 250 mesh screen and let stand for 16 hours to de-aerate. The composition was then applied to a 20-pound unsized sulfite paper in amounts corresponding to 16 pounds of dry coating per 500-ream of 25 by 38 inch sheets. The coated paper was dried, conditioned at 70° F. and 50 per cent relative humidity and calendered. The coated paper had greater flexibility, more resistance to water, improved printability, and better gloss than paper coated in similar manner except for employing starch alone as the adhesive.

Example 3

A coating composition was prepared by stirring 80 parts by weight of clay, 20 parts of precipitated calcium carbonate, 66.7 parts of water and 0.5 part of tetrasodium pyrophosphate ($Na_4P_2O_7 \cdot 10H_2O$) to a smooth paste and adding thereto 14 parts of oxidized corn starch dispersed in 42 parts of water. This was followed by 7 parts of a copolymer of 40 per cent butadiene and 60 per cent styrene as a synthetic latex containing 45 per cent by weight of the copolymer. The composition was screened through a 250 mesh screen and a coating thereof was applied to an unsized sulfite paper. The calendered paper was superior to paper coated with a similar pigment composition containing only starch as the adhesive in gloss, smoothness, toughness, adhesiveness, flexibility, and resistance to curl.

Example 4

To a clay dispersion similar to that of Example 1 there was added an aqueous dispersion prepared by heating a mixture consisting of 12 parts of alpha protein (refined soya protein), 63 parts of water and 3 parts of sodium hydroxide at 60° C. for one hour. This was followed by 4 parts of a copolymer of 40 per cent butadiene and 60 per cent styrene as an emulsion containing 45 per cent by weight of the copolymer. The composition was coated on 50-pound unsized sulfite paper in amounts corresponding to 16 pounds of dry coating per 500-ream of 25 by 38 inch sheet, dried and calendered. The finished coated paper was superior to paper coated with a similar coating containing alpha protein alone as the binding agent in adhesive value, flexibility, and printing properties. It had good gloss, resistance to water, and did not curl on printing.

Example 5

To a clay slip similar to that of Example 1 there was added an aqueous dispersion obtained by heating a mixture consisting of 15 parts of soya flour, 47.25 parts of water and 1.89 parts of sodium hydroxide at 60° C. for one hour. This was followed by 3 parts of a copolymer of 40 per cent butadiene and 60 per cent styrene as an aqueous emulsion containing 45 per cent by weight of the copolymer. The composition was applied to a 40-pound unsized sulfite paper in amount corresponding to a dry coating of 16 pounds per 500-ream of 25 by 38 inch sheets, dried and super-calendered. The finished coated paper was flexible, had good gloss, was resistant to curling and had improved adhesive value of the coating compared to a similar coating having soya flour alone as the binding agent. The soya flour employed in this example contained 60 per cent by weight of protein as its adhesive component.

Example 6

To an aqueous slurry, containing 100 parts by weight of clay and prepared by procedure similar to that described in Example 1, there was added a dispersion of casein obtained by heating a mixture consisting of 14 parts by weight of casein, 73.5 parts of water, 1.4 parts of borax and 0.7 part of sodium carbonate for one hour on a water bath at 60° C. To the mixed dispersion of clay and casein there was then added with stirring 14 parts of a copolymer of 30 per cent butadiene and 70 per cent styrene as a synthetic latex containing 40 per cent by weight of the copolymer. The composition was applied to an unsized 20-pound sulfite paper in amount corresponding to a dry coating of 12 pounds per 500-ream of 25 by 38 inch sheets. The coated paper was air-dried at room temperature then conditioned for 16 hours at 70° F. and 50 per cent relative humidity and calendered. The calendered paper had high gloss, better printability, good reflectance and was more flexible than paper having a similar coating containing equivalent amounts of casein alone as the adhesive.

Aqueous coating compositions of mineral pigments containing as adhesive both a dispersion of casein or starch and a copolymer of butadiene and styrene as herein described may be prepared which have thixotropic properties suitable for application of the compositions to paper by machine coating processes.

Other modes of applying the principle of our invention may be employed instead of those explained, change being made as regards the method or products herein disclosed, provided the steps or products stated in any of the following claims or the equivalent of such stated steps or products be employed.

We therefore particularly point out and distinctly claim as our invention:

1. A printing paper having a coating consisting of an intimate mixture of from 8 to 30 parts of adhesive material and 100 parts of mineral pigment, said adhesive material consisting of a size selected from the group consisting of casein, starch, and soya protein, and from 0.333 to 3 parts of a copolymer, of from 30 to 50 per cent butadiene and 70 to 50 per cent styrene, per part of the size.

2. A printing paper having a coating consisting of an intimate mixture of from 8 to 30 parts of adhesive material and 100 parts of clay, said adhesive material consisting of a size selected from the group consisting of casein, starch and soya protein, and from 0.333 to 3 parts of a copolymer, of from 30 to 50 per cent butadiene and from 70 to 50 per cent styrene, per part of the size.

3. A printing paper having a coating consisting of an intimate mixture of from 8 to 30 parts of adhesive material and 100 parts of mineral pigment, said adhesive material consisting of a size selected from the group consisting of casein, starch and soya protein, and from 0.333 to 3 parts of a copolymer, of 40 per cent butadiene and 60 per cent styrene, per part of the size.

4. A printing paper having a coating consisting of an intimate mixture of from 8 to 30 parts of adhesive material and 100 parts of mineral pigment, said adhesive material consisting of casein and from 0.333 to 3 parts of a copolymer, of from 30 to 50 per cent butadiene and 70 to 50 per cent styrene, per part of the casein.

5. A printing paper having a coating consisting of an intimate mixture of from 8 to 30 parts of adhesive material and 100 parts of clay, said adhesive material consisting of casein and from 0.333 to 3 parts of a copolymer, of 40 per cent butadiene and 60 per cent styrene, per part of the casein.

6. A printing paper having a coating consisting of an intimate mixture of from 8 to 30 parts of adhesive material and 100 parts of mineral pigment, said adhesive material consisting of starch and from 0.333 to 3 parts of a copolymer, of from 30 to 50 per cent butadiene and from 70 to 50 per cent styrene, per part of the starch.

7. A printing paper having a coating consisting of an intimate mixture of from 8 to 30 parts of adhesive material and 100 parts of clay, said adhesive material consisting of starch and from 0.333 to 3 parts of a copolymer, of 40 per cent butadiene and 60 per cent styrene, per part of the starch.

8. A printing paper having a coating consisting of an intimate mixture of from 8 to 30 parts of adhesive material and 100 parts of mineral pigment, said adhesive material consisting of soya protein and from 0.333 to 3 parts of a copolymer, of from 30 to 50 per cent butadiene and from 70 to 50 per cent styrene, per part of the soya protein.

9. A printing paper having a coating consisting of an intimate mixture of from 8 to 30 parts of adhesive material and 100 parts of clay, said adhesive material consisting of soya protein and from 0.333 to 3 parts of a copolymer, of 40 per cent butadiene and 60 per cent styrene, per part of the soya protein.

ARTHUR E. YOUNG.
ELMER K. STILBERT.

REFERENCES CITED

The following references are of record in the file of this patent:

UNITED STATES PATENTS

| Number | Name | Date |
|---|---|---|
| 2,395,992 | Clark | Mar. 5, 1946 |
| 2,416,232 | Soday | Feb. 18, 1947 |
| 2,426,165 | Bulifant | Aug. 26, 1947 |
| 2,441,523 | Ward | May 11, 1948 |

OTHER REFERENCES

Serial No. 397,138, Fikentscher et al. (A. P. C.), published May 11, 1943.

Nazzaro, "General Aspects of GR-S Rubber Saturants" in Paper Trade Journal, Sept. 28, 1944, pp. 131-134.